United States Patent
Ulintz

(10) Patent No.: US 7,784,830 B2
(45) Date of Patent: Aug. 31, 2010

(54) AXIALLY ADJUSTABLE STEERING COLUMN ASSEMBLY WITH FLEXIBLE BEARING SLEEVE

(75) Inventor: Peter J. Ulintz, Broadview Heights, OH (US)

(73) Assignee: Chrysler Group LLC, Auburn Hills, MI (US)

( * ) Notice: Subject to any disclaimer, the term of this patent is extended or adjusted under 35 U.S.C. 154(b) by 528 days.

(21) Appl. No.: 10/692,217

(22) Filed: Oct. 23, 2003

(65) Prior Publication Data

US 2005/0087970 A1 Apr. 28, 2005

(51) Int. Cl.
*B62D 1/18* (2006.01)
(52) U.S. Cl. .......................... 280/775; 74/492; 74/493; 280/777; 384/215; 384/220
(58) Field of Classification Search .............. 280/775, 280/777; 74/492, 493; 384/215, 220
See application file for complete search history.

(56) References Cited

U.S. PATENT DOCUMENTS

| | | | |
|---|---|---|---|
| 3,457,800 A | 7/1969 | Toshida et al. | |
| 3,597,994 A | 8/1971 | Shiomi et al. | |
| 3,665,777 A | 5/1972 | Jensen | |
| 3,699,824 A | 10/1972 | Staudenmayer | |
| 3,703,105 A * | 11/1972 | Milton et al. | 74/492 |
| 3,757,601 A | 9/1973 | Burke | |
| 3,788,148 A * | 1/1974 | Connell et al. | 74/492 |
| 3,803,939 A | 4/1974 | Schenten | |
| 4,509,386 A * | 4/1985 | Kimberlin | 74/492 |
| 4,867,003 A * | 9/1989 | Beauch et al. | 74/492 |
| 4,886,295 A * | 12/1989 | Browne | 280/777 |
| 5,115,691 A | 5/1992 | Beauch | |
| 5,507,203 A | 4/1996 | Audibert et al. | |
| 5,590,565 A * | 1/1997 | Palfenier et al. | 74/493 |
| 5,639,177 A | 6/1997 | Thomas | |
| 5,669,633 A | 9/1997 | Naff et al. | |
| 5,722,300 A * | 3/1998 | Burkhard et al. | 74/493 |
| 5,758,545 A * | 6/1998 | Fevre et al. | 74/493 |
| 6,109,652 A | 8/2000 | Kim et al. | |
| 6,170,862 B1 | 1/2001 | Hoagland et al. | |
| 6,324,935 B1 | 12/2001 | Schoen et al. | |
| 6,339,970 B1 | 1/2002 | Blex | |
| 6,343,993 B1 * | 2/2002 | Duval et al. | 464/167 |
| 6,371,519 B1 * | 4/2002 | Jurik et al. | 280/777 |
| 6,389,923 B1 * | 5/2002 | Barton et al. | 280/777 |
| 6,514,001 B1 | 2/2003 | Yezersky et al. | |
| 6,729,648 B2 * | 5/2004 | Ulintz | 280/777 |

FOREIGN PATENT DOCUMENTS

GB 2205149 * 11/1988

* cited by examiner

*Primary Examiner*—Eric Culbreth
(74) *Attorney, Agent, or Firm*—Ralph E. Smith

(57) ABSTRACT

A telescoping steering column assembly has an inner jacket and an outer jacket telescopically engaged with a sleeve between the inner and outer jackets. The sleeve has internal and external ribs which run parallel to a longitudinal axis of the sleeve, the internal ribs contacting an outer surface of the inner jacket, and the external ribs contacting an inner surface of the outer jacket. The internal and external ribs are circumferentially offset to allow the wall of the sleeve to flex relative to the opposing surfaces of the jackets, resulting in smooth telescoping action of the assembly without lash. In addition, the system provides a constant collapsing force and provides guidance for a controlled collapse of either a telescoping or non-telescoping column assembly in a vehicle crash impact.

10 Claims, 2 Drawing Sheets

AXIALLY ADJUSTABLE STEERING COLUMN ASSEMBLY WITH FLEXIBLE BEARING SLEEVE

FIELD OF THE INVENTION

The present invention pertains generally to steering column assemblies and, more particularly, to axially adjustable steering column assemblies for use in steering systems of vehicles.

BACKGROUND OF THE INVENTION

Axially adjustable steering column assemblies for vehicles are designed to extend and retract axially toward and away from the driver, and to be fixed in a desired axially extended or retracted position. A common arrangement uses an outer tube or jacket with one end oriented to the steering wheel and a distal end adapted to receive an inner tube or jacket, with appropriate clearance between the telescoping jackets. A desirable arrangement provides smooth, low effort telescoping extension and retraction, free of perceptible lash, or looseness, while providing high stiffness to resist deflection when a moment force is applied. A problem in practice pertains to the conflicting requirements of high vertical and lateral stiffness with low telescoping efforts. The amount of lash and stiffness reduction can increase with extension of the column, or with decreased telescoping effort from too large a clearance between the jackets. Variances in telescoping tolerances which adversely affect smooth operation of column extension and retraction are caused by fluctuations in tube stock, warping from welding operations such as welded attachment of brackets to the tubes, and random moment forces as applied, for example, through an attached steering wheel. These variances in telescoping forces also adversely affect the energy management function of steering columns designed to collapse in the event of a crash. A universal solution which reduces or eliminates lash and increases stiffness from all three of these sources while producing smooth, low effort telescoping operation would be desirable.

One approach involves the use of a sleeve between the opposing surfaces of the telescoped jackets. Such sleeves have been made of metal or plastic for interference fit between the opposing surfaces of the jackets, with surface-to-surface contact with one or both of the jackets, and in some versions localized contact with the surface of the other jacket. This is accomplished by projections on one side of the sleeve which contact the opposing jacket surface. This localized contact, while effective in reducing telescoping effort, does not eliminate lash, and generally reduces vertical stiffness, particularly when a bending moment is placed on the column assembly. Sleeves which fit directly over the inner jacket in surface-to-surface contact can transmit imperfections in the outer surface of the inner jacket, producing excess friction. A steering column assembly which provides both the correct amount of frictional resistance to axial movement of the telescoped members, with no lash, and which have high vertical stiffness is desired.

SUMMARY OF THE INVENTION

The present invention is a telescoping column assembly for automotive or other vehicle applications. The invention provides controlled collapsing forces during vehicle crash impact in both telescoping and non-telescoping column assemblies. The telescoping column assembly includes an inner jacket telescopically received within an outer jacket, and a ribbed sleeve at the telescoping interface of the inner and outer jackets. The ribbed sleeve has a plurality of protruding ribs on exterior and interior surfaces which interface respectively with the inner surface of the outer jacket and the outer surface of the inner jacket. In one embodiment, the ribs on the sleeve run parallel to the axial length of the sleeve. The ribs project from the interior surface of the sleeve and from the exterior surface of the sleeve, with a total cross-sectional thickness through the inner and outer ribs being approximately equal to or greater than a clearance dimension between the inner and outer jackets, producing a frictional interference fit of the telescoping members. With the inner and outer ribs providing the contact surfaces between the jackets, the contact surface area and the resulting telescoping effort required is precisely controlled. The axial orientation of the ribs provides a relative radial displacement of select ribs to remove lash in the column assembly. This anti-lash function of the ribbed sleeve can be further enhanced by the introduction of a filler material in voids between the ribs and a jacket surface to provide high vertical and lateral stiffness, as further explained herein.

In accordance with one general aspect of the invention, there is provided a telescoping jacket assembly for use in combination with a telescoping steering column, the telescoping jacket assembly including an outer jacket, an inner jacket telescopically received within the outer jacket, a sleeve between the outer and inner jackets, the sleeve having a wall and at least two internal ribs which protrude from an interior of the wall and contact an outer surface of the inner jacket, and at least two external ribs which protrude from an exterior of the wall and contact an inner surface of the outer jacket to thereby space the wall of the sleeve from the outer jacket and the inner jacket.

In accordance with another aspect of the invention, there is invented a telescoping steering column assembly which includes an outer jacket with a first end and a second end; an inner jacket with a first end and a second end, the first end of the inner jacket dimensioned to be received telescopically within the second end of the outer jacket; a sleeve having a wall and positioned inside of the outer jacket at the second end of the outer jacket; the first end of the inner jacket positioned within the sleeve inside the outer jacket; the assembly configured for relative telescoping movement between the outer jacket and the inner jacket, with an outer surface of the inner jacket in contact with an inner surface of the sleeve, and an inner surface of the outer jacket in contact with an outer surface of the sleeve, the inner surface of the sleeve which contacts the outer surface of the inner jacket located on at least one internal rib which protrudes from the wall of the sleeve and is aligned with a longitudinal axis of the sleeve, and the outer surface of the sleeve which contacts the inner surface of the outer jacket located on at least one external rib which protrudes from the wall of the sleeve and is aligned with a longitudinal axis of the sleeve.

In one embodiment of the invention, an internal rib of the sleeve is circumferentially offset from an external rib of the sleeve, thereby allowing flexure of the wall of the sleeve between the internal rib and the external rib.

These and other features and advantages of the invention are further described in detail with reference to the accompanying drawing Figures.

DETAILED DESCRIPTION OF PREFERRED AND ALTERNATE EMBODIMENTS

Figure 1:
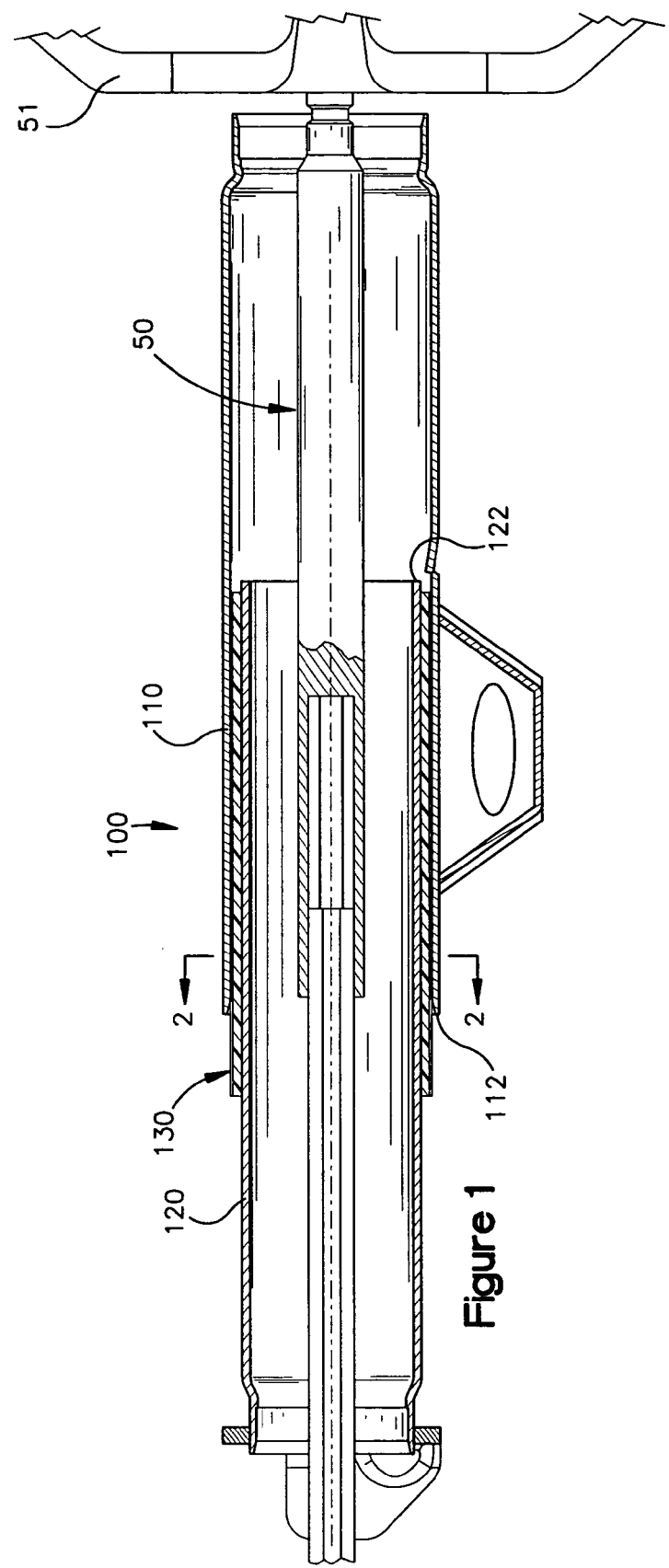
FIG. 1 is a cross-sectional view of a telescoping steering column assembly in accordance with the present invention.

As illustrated in the Figures, an axially adjustable column assembly with lash dampening is shown generally at 100, to include an outer jacket 110, an inner jacket 120 having an end 122 which is telescopically received within a distal end 112 of outer jacket 110, and a sleeve 130 positioned over end 122 of inner jacket 120 and within distal end 112 of outer jacket 110. In a particular installation in a vehicle, the inner jacket 120 may be fixed to surrounding structure, for example to the surrounding frame of an automobile, so that the outer jacket 110 telescopes relative to, in and out of, the inner jacket 120, along with a two-piece telescoping steering shaft 50 attached to steering wheel 51. Alternatively, the outer jacket 110 may be fixed, with the inner jacket 120 able to telescope relative to the outer jacket 110, and with the steering wheel oppositely configured.

As shown in FIGS. 2A, 2B, 3 and 4, sleeve 130 is provided with internal ribs 132 dimensioned for contact with the outer surface of inner jacket 120, and external ribs 134 dimensioned for contact with the inner surface of outer jacket 110. The internal ribs 132 are preferably circumferentially offset from the external ribs 134 as shown in FIG. 2, although other positions and configurations of ribs are within the scope of the invention, as further described herein, such as the internal and external ribs being circumferentially aligned, or partially circumferentially offset with some overlap of the respective contact surfaces, or circumferentially offset completely with no overlap of the respective contact surfaces. The sleeve 130 preferably remains fixed inside of the outer jacket 110, and in sliding or slidable contact with an inner surface of the outer jacket 110. Alternatively, the sleeve 130 may be fixed relative to the inner jacket 120 and in sliding or slidable contact with outer jacket 110.

The amount of contact area of the external and internal ribs 132, 134 of the sleeve 130 with the opposing jacket surfaces is determined by the width of the ribs, which can be selectively designed according to the amount of static and kinetic friction desired in the column assembly. In this embodiment, the total sliding contact surface area of the sleeve 130 is the combined surface area of the internal ribs 132 relative to the inner jacket 120, with the sleeve remaining fixed relative to the distal end 112 of outer jacket 110. The areas 133 between the internal ribs 132 and the outer surface of inner jacket 120 are left open. One or more of the areas 135 between the external ribs 134 and the inner surface of outer jacket 110 can be filled or partially filled with a material 136, such as a filler or bonding material, such as an adhesive, or elastomer or polymer which may have adhesive and elastic properties, or any other material or materials of comparable performance. The filling of area or areas 135 with material 136 compensates for small variations in the wall of outer jacket 110 and also stiffens the sleeve 130 which provides the telescoping bearing surface for the inner jacket 120 as further described. The sleeve 130 does not simply conform to the internal surface of outer jacket 110 as a liner, but rather the presence of external ribs 134 defines the contact surface area between the jackets and enables the sleeve to accommodate both to the interior surface of outer jacket 110 along with any imperfections therein, and to accommodate to the exterior surface of inner jacket 120 as further described. The performance of sleeve 130 as a type of flexible linear bearing can be further tuned by selective placement of material 136 within only certain of areas 135, such as for example those areas 135 located at the radial top and/or bottom of the column (i.e., 0° and 180°) to stiffen the assembly in this dimension most likely to receive an externally applied moment force. Although the sleeve 130 is described in this embodiment as fixedly secured or bonded to the outer jacket 110, other relative arrangements of the components are contemplated as within the scope of the invention. For example, in telescoping column systems in which the inner jacket moves relative to the outer jacket, the sleeve 130 may be fixedly secured to the outer surface of the inner jacket, with the external ribs 134 sliding against the inner surface of the outer jacket.

Figure 2A:
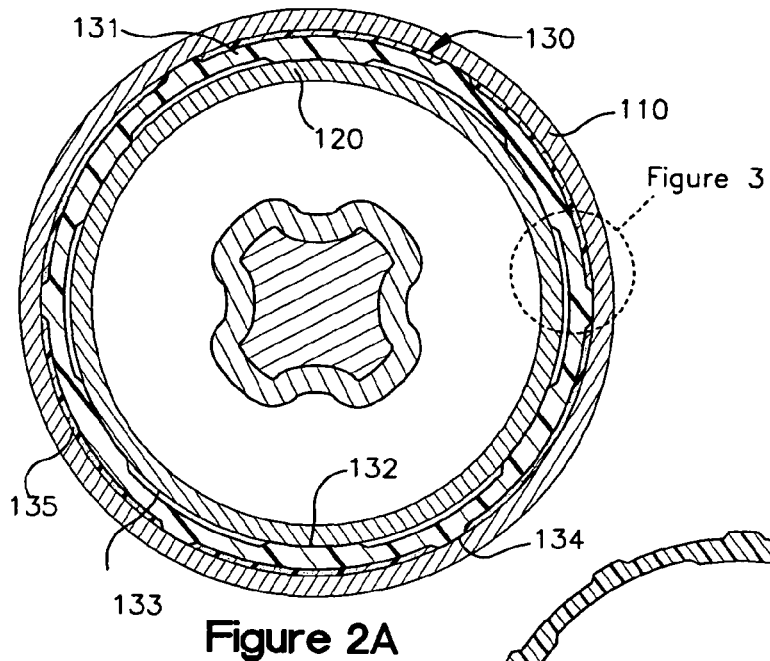
FIG. 2 is a axial cross-sectional view of the steering column assembly of FIG. 1, along the lines 2-2 in FIG. 1.
Figure 4:
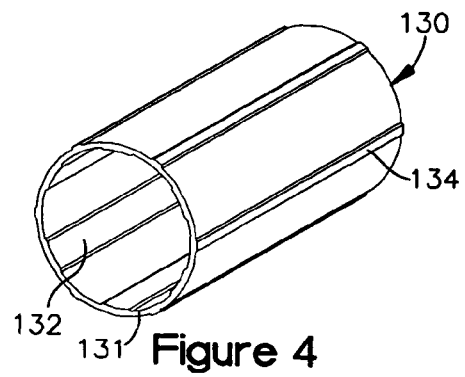
FIG. 4 is a perspective view of a ribbed tube component of the steering assembly of FIG. 1.

As further shown in FIGS. 2A-4, internal ribs 132 define the sliding contact surface areas with the outer surface of inner jacket 120. Placement of the internal ribs 132 in a circumferentially offset arrangement relative to external ribs 134, as shown in FIGS. 2A and 4, enables the wall 131 of sleeve 133 to flex, to thereby accommodate any undulations or variations in the outer surface of inner jacket 120 as it slides along the length thereof in the telescoping operation. Similarly, if the sleeve 130 is fixed relative to the inner jacket 120, the circumferentially offset internal and external ribs 132, 134 allow the wall 131 of the sleeve to flex in order to accommodate variations in the internal surface or internal diameter dimension of the outer jacket 110.

Figure 2B:
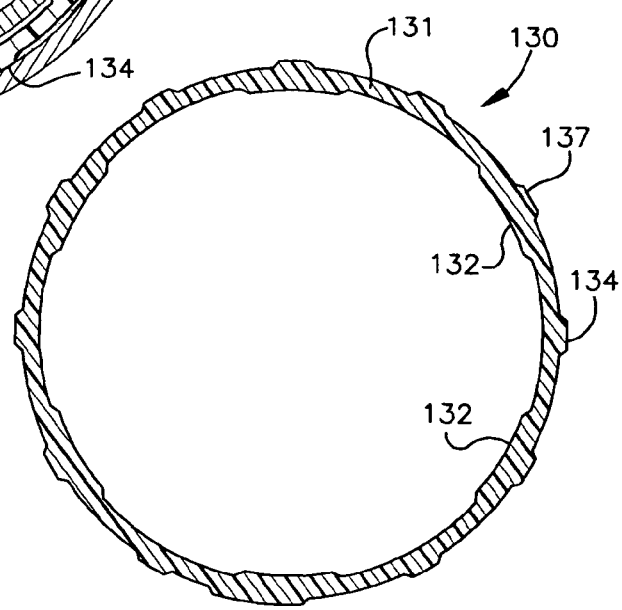
Figure 3:
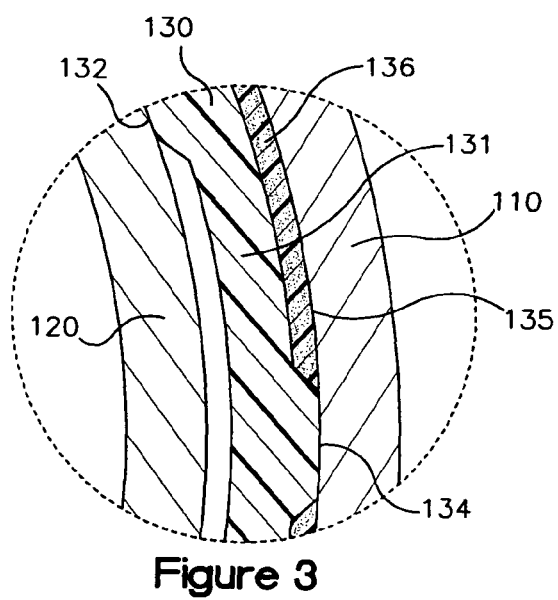
FIG. 3 is an enlarged cross-sectional view of the area of the steering column assembly indicated in FIG. 2.

Alternatively, as shown in FIG. 2B, sleeve 130 may be friction fit within outer jacket 110 by contact of biasing ribs 137, which are located opposite selected internal ribs 132, or opposite each of the internal ribs 132, with external ribs 134 positioned circumferentially between as shown in FIG. 2B. Biasing ribs 137 eliminate the need for a bonding material 136 in areas 135, by compressing the external ribs 134 against the interior of outer jacket 110 to securely position the sleeve 130 between the jackets. With areas 135 left open, the wall 131 of the sleeve 130 is free to flex in a radial direction as described. The friction fit of the enlarged biasing ribs 137 within outer jacket 110 causes some radial distortion of the sleeve and the contact surfaces of internal ribs 132. This can be corrected by machining the inner diameter of the sleeve 130 or of the contact surfaces of internal ribs 132 after the sleeve is installed in outer jacket 110 to the correct tolerance to receive inner jacket 120. Any variations in the outer surface of inner jacket 120 are then accommodated for by the flexure of the wall 131 of sleeve 133. Alternatively, the internal and external ribs 132, 134 of the sleeve 130 may be partially circumferentially offset so that the contact surface areas of the ribs partially overlap, as shown for example at the bottom of FIG. 2B.

What is claimed as the invention is:

1. A telescoping jacket assembly for use in a telescoping steering column, the telescoping jacket assembly comprising:
    an outer jacket defining a generally-cylindrical inner surface;
    an inner jacket telescopically received within the outer jacket, the inner jacket defining a generally-cylindrical outer surface in opposition with the inner surface of the outer jacket; and
    a flexible sleeve including a generally-cylindrical wall disposed between the inner surface of the outer jacket and the outer surface of the inner jacket,
    wherein the sleeve includes a plurality of internal ribs protruding from the wall to define internal contact surfaces on the sleeve in engagement with the outer surface of the inner jacket and which do not extend through the outer surface of the inner jacket to thereby radially space the wall from the outer surface of the inner jacket and allow telescoping movement of the inner jacket relative to the sleeve and in contact with the at least two internal ribs of the sleeve, wherein the sleeve includes a plurality of first and second external ribs protruding from the wall to define external contact surfaces on the sleeve in engagement with the inner surface of the outer jacket to thereby space the wall from the outer jacket, and each of the first plurality of external ribs being circumferentially aligned with a respective internal rib, each of the second plurality of external ribs being circumferentially offset completely from each immediately proximate internal rib.

2. The steering column assembly of claim 1, wherein the internal and external ribs of the sleeve are generally aligned with a longitudinal axis of the sleeve.

3. The steering column assembly of claim 1, further comprising a bonding agent located between the sleeve and the outer jacket.

4. The steering column assembly of claim 1, wherein a width dimension of an internal rib of the sleeve is greater than a width dimension of an external rib of the sleeve.

5. The steering column assembly of claim 1, wherein a combined thickness dimension of the wall of the sleeve, at least one internal rib, and at least one external rib is at least equal to a distance between the outer surface of the inner jacket and the inner surface of the outer jacket.

6. The steering column assembly of claim 1, wherein a segment of the sleeve extends past the distal end of the outer jacket.

7. The steering column assembly of claim 1, wherein the sleeve flexes between the outer surface of the inner jacket and the inner surface of the outer jacket.

8. The steering column assembly of claim 1, wherein the outer jacket is fixed, the sleeve is secured to the outer jacket, and the inner jacket moves axially relative to the outer jacket and the sleeve.

9. The steering column assembly of claim 1, wherein the inner jacket is fixed, the sleeve is secured to the outer jacket, and the outer jacket and sleeve move axially relative to the inner jacket.

10. The telescoping jacket assembly of claim 1, further including a third external rib partially circumferentially overlapping one of the internal ribs.

* * * * *